United States Patent
Savage

[19]

[11] Patent Number: 6,022,032
[45] Date of Patent: Feb. 8, 2000

[54] FIREWOOD TRANSPORT AND STORAGE DEVICE

[76] Inventor: Michael Savage, Rte. 1, Box 20, Seminole, Tex. 79360

[21] Appl. No.: 09/296,205

[22] Filed: Apr. 21, 1999

Related U.S. Application Data

[60] Provisional application No. 60/082,754, Apr. 23, 1998.

[51] Int. Cl.[7] .................................................. B62B 1/02
[52] U.S. Cl. ............................ 280/47.24; 280/47.315; 280/47.33
[58] Field of Search .......................... 280/47.24, 47.19, 280/47.17, 47.18, 47.27, 47.28, 47.29, 47.3, 47.31, 47.315, 47.33, 47.34, 47.35, 47.37, 651, 652

[56] References Cited

U.S. PATENT DOCUMENTS

| | | |
|---|---|---|
| D. 260,753 | 9/1981 | Partain . |
| D. 264,572 | 5/1982 | Lowry . |
| D. 264,759 | 6/1982 | Schilling et al. . |
| 308,362 | 11/1884 | Hughes ............................. 280/47.315 |
| 3,762,738 | 10/1973 | Christina .............................. 280/47.33 |
| 4,179,132 | 12/1979 | Rich . |
| 4,264,081 | 4/1981 | Markham . |
| 4,343,487 | 8/1982 | Crothers . |
| 4,362,309 | 12/1982 | Stamper .............................. 280/47.33 |
| 4,413,834 | 11/1983 | Base . |
| 4,469,341 | 9/1984 | Creim . |
| 4,570,961 | 2/1986 | Chateauneuf et al. . |
| 4,588,197 | 5/1986 | Bendetto, Jr. ....................... 280/47.315 |
| 4,861,057 | 8/1989 | Kunkle . |
| 4,958,846 | 9/1990 | Greenberg . |
| 5,228,716 | 7/1993 | Pahl . |
| 5,328,192 | 7/1994 | Thompson ......................... 280/47.315 |

*Primary Examiner*—Richard M. Camby
*Attorney, Agent, or Firm*—Tipton L. Randall

[57] ABSTRACT

The invention is a firewood transport and storage device. The device comprises a portable wood rack having a tubular U-shaped base frame with a two-wheeled chassis assembly at one end and support stand at the opposite end. A pair of fold down handles is connected to the frame opposite the wheeled chassis assembly for moving the wood rack as one would a wheelbarrow. The device can be disassembled into component sections for storage or shipping.

7 Claims, 3 Drawing Sheets

FIREWOOD TRANSPORT AND STORAGE DEVICE

CROSS REFERENCE TO RELATED APPLICATION

This application claims the benefit under 35 U.S.C. §119 (e) of co-pending provisional application Ser. No. 60/082,754, filed Apr. 23, 1998. Application Ser. No. 60/082,754 is hereby incorporated by reference.

FIELD OF THE INVENTION

The invention relates to a firewood storage device and, more particularly, to a device for both transport and storage of firewood.

BACKGROUND OF THE INVENTION

The use of wood for cooking and heating of homes is an ancient practice. In modern homes there is not always a convenient place to store such firewood. In addition to the need for a storage site, it is desirable to maintain the firewood in a relatively dry condition prior to bringing it into the home for burning.

A number of innovations have been developed relating to devices for transporting and/or storing firewood or similar materials. The following U.S. patents are representative of some of those innovations.

The three design patents of Partain (U.S. Des. 260,753), Lowry (U.S. Des. 264,572) and Schilling et al. (U.S. Des. 264,759) show small, wheeled carriers of various structure. The Lowry design shows a tube structure while the Partain design uses a wheelbarrow type construction.

Greenberg, in U.S. Pat. No. 4,958,846, discloses a two-wheeled leaf cart with removable handle.

Bass, in U.S. Pat. No. 4,413,834, shows a two-wheeled carrier with solid bottom and a handle to lift one end off the ground to move the carrier.

Rich, in U.S. Pat. No. 4,179,132, discloses a hand truck with a tubular frame.

In U.S. Pat. No. 4,861,057, Kunkle shows a cart with two wheels and a ground support tube very close to the wheels. The cart converts to a canoe carrier as well.

A folding cart with a fabric body and a collapsible tubular frame is disclosed by Crothers in U.S. Pat. No. 4,343,487.

Creim, in U.S. Pat. No. 4,469,341, discloses a cart with detachable U-shaped support for firewood and the like.

In U.S. Pat. No. 4,264,081, Markham describes a four-wheeled upright cart with tubular frame for transporting and storing firewood.

U.S. Pat. No. 4,570,961 by Chateauneuf et al. discloses a two-wheeled cart with telescoping frame that has a detachable barrow with a handle for the cart.

In U.S. Pat. No. 5,228,716, Dahl shows a convertible transport cart with four wheels and tubular frame. The ends of the cart fold flat for storage.

Thus, there is an unmet need for a suitable device that can transport firewood or similar material from one point to another, as well as serve as storage device for such transported firewood.

SUMMARY OF THE INVENTION

A firewood transport and storage device comprises a base frame member having first and second planar U-shaped tubular frame sections held in a parallel orientation a selected distance apart by a plurality of support cross members fastened perpendicularly between them. The base frame member has a generally horizontal center portion and first and second generally vertical end portions.

A two-wheeled chassis assembly is attached at a first end of the base frame member horizontal center portion opposite the first generally vertical end portion. The chassis elevates the base frame member first end a selected distance above a support surface. Each wheel of the chassis is positioned exterior the first and second planar U-shaped tubular frame sections. A support member is attached at a second end of the base frame member horizontal center portion opposite the second generally vertical end portion. The support member elevates the base frame member second end a like selected distance above the support surface, with at least a portion of the support member extending exterior the first and second planar U-shaped tubular frame sections.

A first rigid tubular handle member is coplanar and pivotally attached at the handle member first end to the planar first U-shaped frame section contained in the second generally vertical end portion adjacent the support member. A second rigid tubular handle member is coplanar and pivotally attached at the handle member first end to the planar second U-shaped frame section contained in the second generally vertical end portion adjacent the support member.

A pivoting means is provided for each handle member to pivot from a vertical orientation, with the second end of each handle member adjacent the support surface, to a horizontal orientation, with the second end of each handle member moving no higher than the first end of each handle member.

DESCRIPTION OF THE PREFERRED EMBODIMENTS

Nomenclature

Figure 1:
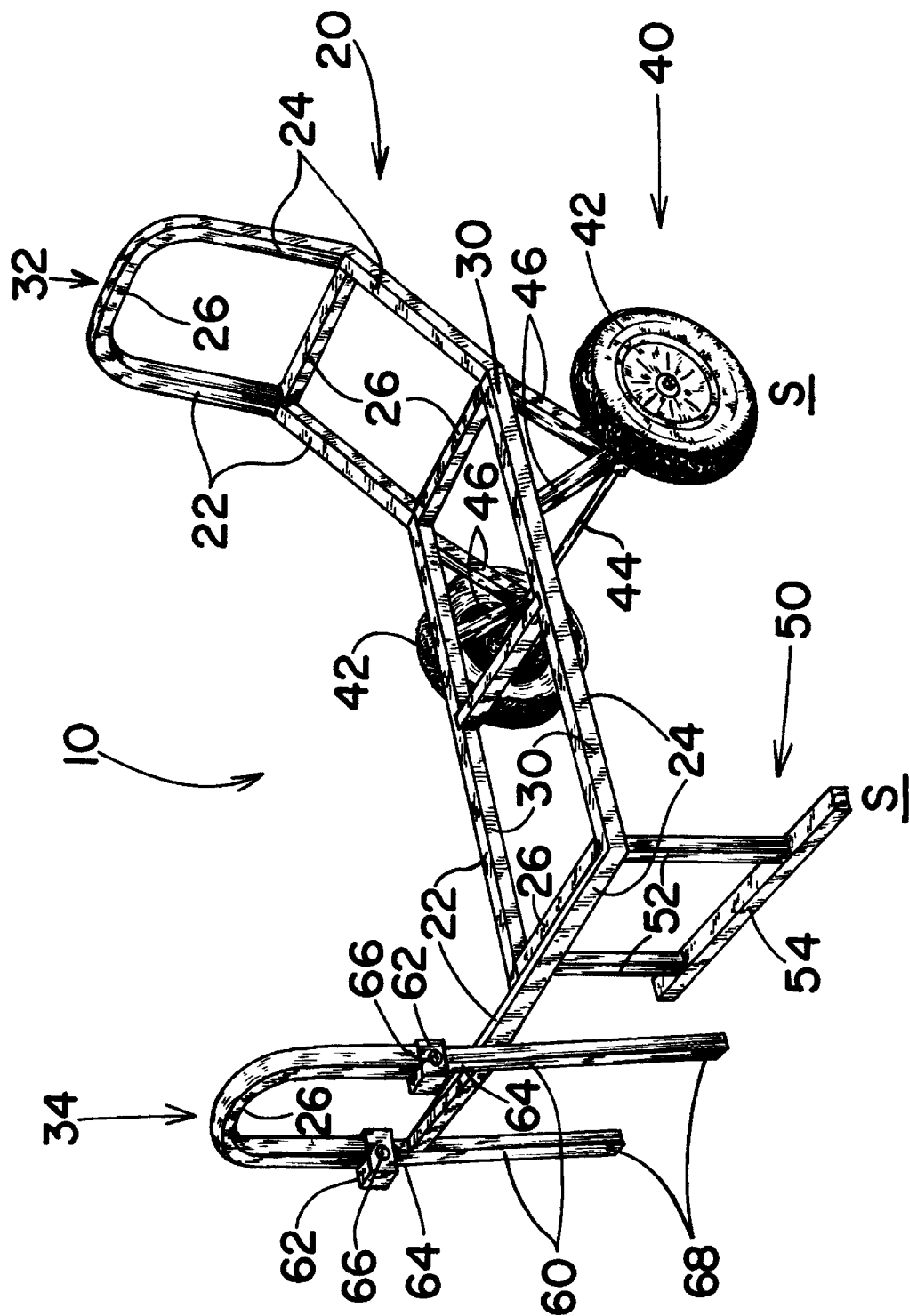
FIG. 1 is a elevational perspective view of the wood rack of the present invention.

10 Firewood Transport and Storage Device
20 Base Frame Member
22 First Planar U-Shaped Frame Section
24 Second Planar U-Shaped Frame Section
26 Frame Support Cross Members
30 Horizontal Portion of Base Frame Member
32 First Vertical End Portion of Base Frame Member
34 Second Vertical End Portion of Base Frame Member
40 Two-Wheeled Chassis Assembly
42 Wheel of Chassis
44 Axle of Chassis
46 Chassis Connecting Members
50 Support Member for Base Frame Member
52 Vertical Legs of Support Member
54 Horizontal Tubular Member of Support Member
60 Rigid Tubular Handle Members
62 Linear U-Shaped Bracket Members
64 First End of Handle Member 66 Handle Pivot Bolt Member
68 Second End of Handle Member
70 Handle Lock Bolt
72 Apertures for Lock Bolt Member
S Support Surface Construction Referring to FIG. 1, the firewood transport and storage device 10 of the present invention is shown. The device, also called a wood rack, is primarily constructed of tubular metal components for strength and light weight. The device comprises a base frame member 20 made up of first 22 and second 24 planar U-shaped tubular frame sections. The planar U-shaped sections 22, 24 are held in parallel orientation and a selected distance apart by a plurality of support cross members 26. The cross members 26 are fastened perpendicularly between the two U-shaped frame sections, thus producing a rigid base frame member 20 capable of supporting a quantity of firewood logs or the like. The number of support cross members 26 may vary, depending upon the size of the device. In the embodiment shown in FIG. 1, there are a total of seven cross members 26. The base frame member 20 thus has a generally horizontal center portion 30 and first 32 and second 34 generally vertical end portions. The center portion 30 supports the firewood logs while the end portions 32, 34 prevent the logs from rolling off the base frame member 20.

A two-wheeled chassis assembly 40 is attached at a first end of the base frame member horizontal center portion 30. The two-wheeled chassis assembly 40 is positioned opposite the first generally vertical end portion 32, and below the horizontal center portion 30 of the base frame member 20. The chassis wheels 42 are mounted at the ends of an axle 44 with the chassis assembly connecting members 46 fastened to the frame center portion 30. The chassis connecting members 46 contains suitable bearings (not shown) to allow the axle 44 and attached wheels 42 to rotate with ease. The two-wheeled chassis assembly 40 elevates the base frame member first end a selected distance above the support surface S on which the wood rack device 10 rests. The wheels 42 of the chassis assembly 40 are positioned so as to be exterior the first 22 and second 24 planar U-shaped tubular frame sections. This wheel location provides stability to the wood rack device 10 when filled with logs. Unlike a wheelbarrow with one wheel, the wood rack device 10 is not prone to tipping when carrying a large load of firewood logs.

A support member 50 is attached at a second end of said base frame member horizontal center portion 30. The support member 50 is positioned opposite the second generally vertical end portion 34, and below the horizontal center portion 30 of the base frame member 20. The support member 50 is U-shaped with two vertical legs 52, one leg attached to each side of the base frame member 20. A horizontal tubular member 54 is attached between the vertical legs 52, with the horizontal member 54 contacting the support surface S. The horizontal tubular support member 54 extends beyond the two planar U-shaped frame sections 22, 24 to provide additional stability from tipping of the wood rack device 10. The support member 50 elevates the base frame member second end a like selected distance above the support surface S, thus providing a horizontal orientation for the base frame member relative to the support surface S.

Figure 2:
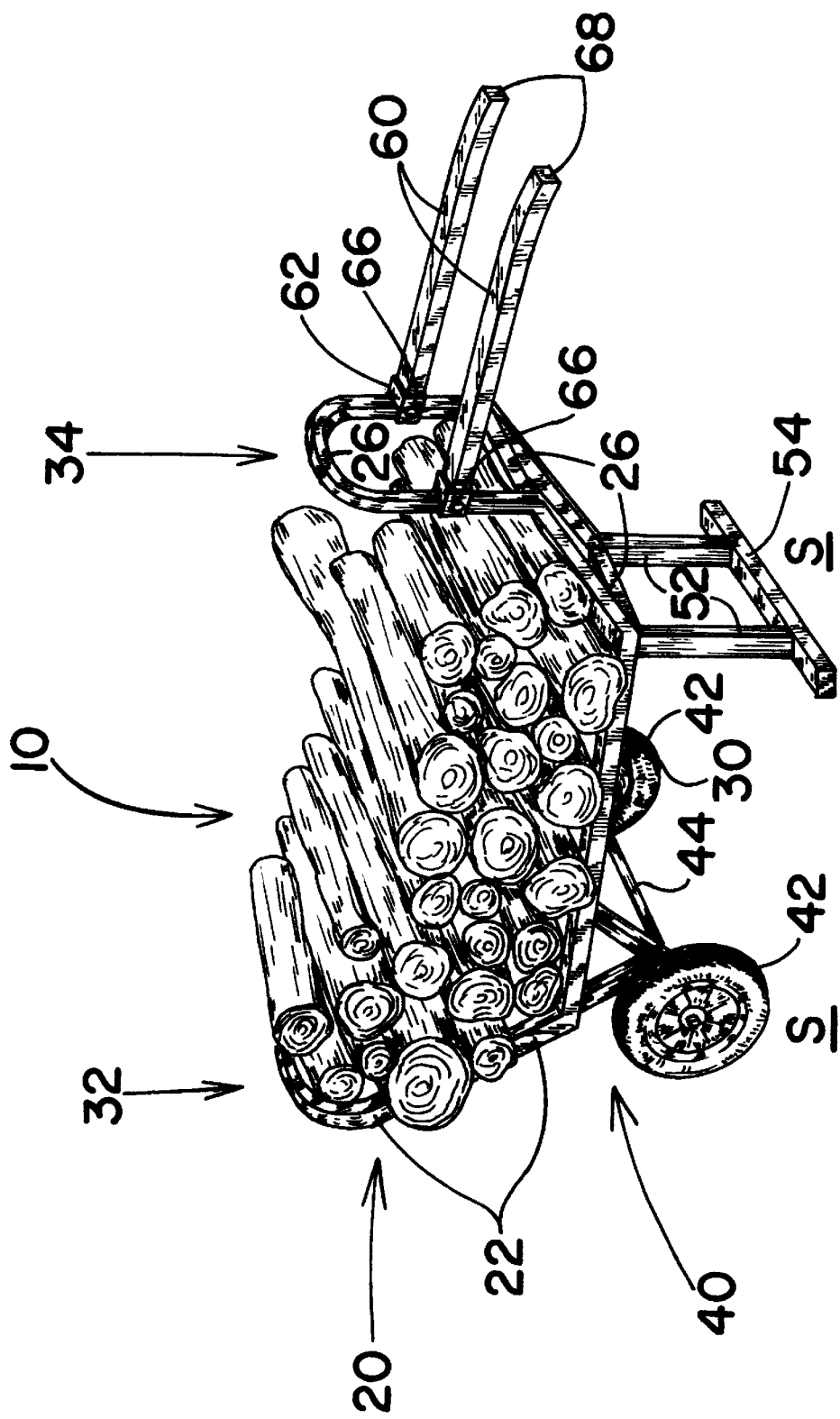
FIG. 2 is an elevational perspective view of the wood rack filled with a load of wood.
Figure 3:
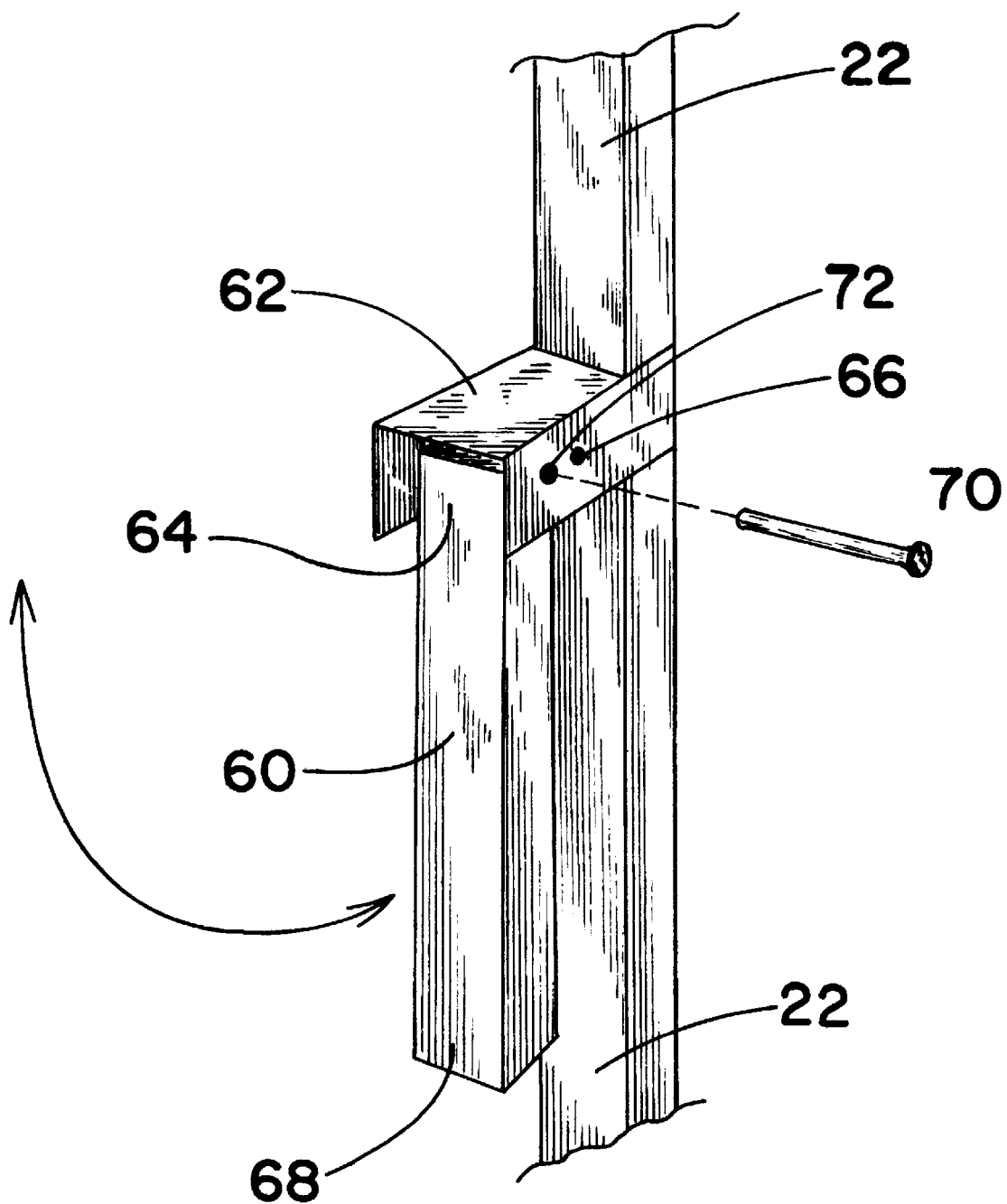
FIG. 3 is a perspective view of the connection of the handle member to the frame section.

A pair of rigid tubular handle members 60 are secured to the second vertical end portion 34 of the frame member 20 opposite the support member 50 for lifting that end of the wood rack device 10 off the support surface S for transport. One handle member 60 is attached, via a linear U-shaped bracket member 62, to each of the first 22 and second 24 planar U-shaped frame sections. The handles member 60 are coplanar with the respective frame sections 22, 24. Each bracket member 62 is attached to the corresponding frame section with the opening of the U-shaped bracket 62 oriented downward, toward the support surface S. A first end 64 of one handle member 60 fits inside the U-shaped bracket 62. The handle end 64 is held in place by a pin or bolt member 66 that passes through both the handle first end 64 and the bracket member 62. The pin member 66 is positioned to allow the handle member 60 to hang vertically downward with the second end 68 of the handle member 60 close to the support surface S, as seen in FIG. 1. To elevate the handled end of the wood rack device 10, an individual grasps the second end 68 of each handle member 60 and lifts both handle members 60 to a horizontal orientation. The handle members 60 pivot about the pin member 66 to a horizontal position, but do not pivot beyond horizontal due to contact with the U-shaped bracket member 62 as shown in FIG. 2. An individual can thus elevate the handled end of the wood rack device 10 for easy transport of firewood contained therein. Thus, the handle members 60 hang vertically when the wood rack device 10 is not in use, as shown in FIG. 3, then can be pivoted to a horizontal orientation when it is desired to transport the wood rack device 10, as shown in FIG. 2. Also provided is a removable second pin or bolt member 70 that passes through aligned apertures 72 in the bracket member 62 and handle first end 64. The pin or bolt member 70 locks the handle member 60 in the horizontal orientation, providing enhanced control of the loaded wood rack device 10 when moving it from one location to another. The base frame member 20 thus elevates the firewood therein above any water or snow that might be encountered during transport or storage.

The wood rack device 10 can be designed as a welded unit, except for the pivoting handle members 60. Alternatively, the wood rack device can be fabricated in sections that are reversibly connected, allowing for ease of storage or shipment.

While the invention has been particularly shown and described with reference to a preferred embodiment thereof, it will be understood by those skilled in the art that various changes in form and details may be made therein without departing from the spirit and scope of the invention.

I claim:

1. A firewood transport and storage device comprising;
    (a) a base frame member comprising first and second planar U-shaped tubular frame sections held in parallel orientation a selected distance apart by a plurality of support cross members fastened perpendicularly between said U-shaped first and second frame sections, said base frame member having a generally horizontal center portion and first and second generally vertical end portions;
    (b) a two-wheeled chassis assembly attached to a first end of said base frame member horizontal center portion opposite said first generally vertical end portion attached thereto, said chassis assembly elevating said base frame member first end a selected distance above a support surface, each wheel of said chassis assembly positioned exterior said first and second planar U-shaped tubular frame sections;
    (c) a support member attached to a second end of said base frame member horizontal center portion opposite said second generally vertical end portion attached thereto, said support member elevating said base frame member second end a like selected distance above the support surface, at least a portion of said support member extending exterior said first and second planar U-shaped tubular frame sections;

(d) a pair of rigid tubular handle members each with first and second ends, a first handle member coplanar and pivotally attached at said handle member first end to said planar first U-shaped frame section contained in said second generally vertical end portion adjacent said support member, a second handle member coplanar and pivotally attached at said handle member first end to said planar second U-shaped frame section contained in said second generally vertical end portion adjacent said support member; and (e) means for pivoting each handle member from a vertical orientation, with said second end of each handle member adjacent the support surface, to a horizontal orientation, with said second end of each handle member moving no higher than said first end of each handle member.

2. The firewood transport and storage device of claim 1 further comprising;

f) means for locking each handle member in a horizontal orientation.

3. The firewood transport and storage device of claim 1 wherein, said chassis assembly comprises first and second wheel members fastened at opposite ends of an axle member, said axle member rotatably secured to said base member by a pair of spaced apart connecting members.

4. The firewood transport and storage device of claim 1 wherein, said support member comprises a U-shaped member having a pair of vertical leg members, one vertical leg member attached to each side of said second end of said base frame member, and a horizontal tubular member attached between said vertical leg members and extending exterior said first and second planar U-shaped tubular frame sections.

5. The firewood transport and storage device of claim 1 wherein, said means for pivoting each handle member from a vertical orientation to a horizontal orientation, with said second end of each handle member moving no higher than said first end of each handle member, comprises a linear U-shaped bracket member with an open bottom and open ends, said bracket member attached to one planar U-shaped frame section contained in said second generally vertical end portion adjacent said support member, said bracket member sized to accept a handle member first end, with a first pin member passing through said bracket member and handle member first end positioned therein, thereby allowing rotation of said handle member about said pin member from a vertical orientation to a horizontal orientation with said bracket member preventing movement of said handle member second end higher than said handle member first end rotatably fastened in said bracket member.

6. The firewood transport and storage device of claim 5 wherein, said means for locking each handle member in a horizontal orientation comprises a second pin member for insertion through a pair of apertures in said bracket member, said handle member first end having apertures alignable with said bracket member pair of apertures by rotation of said handle member to a horizontal orientation.

7. A firewood transport and storage device comprising;

(a) a base frame member comprising first and second planar U-shaped tubular frame sections held in parallel orientation a selected distance apart by a plurality of support cross members fastened perpendicularly between said U-shaped first and second frame sections, said base frame member having a generally horizontal center portion and first and second generally vertical end portions;

(b) a two-wheeled chassis assembly attached to a first end of said base frame member horizontal center portion opposite said first generally vertical end portion attached thereto, said chassis assembly elevating said base frame member first end a selected distance above a support surface, each wheel of said chassis assembly positioned exterior said first and second planar U-shaped tubular frame sections;

(c) a support member attached to a second end of said base frame member horizontal center portion opposite said second generally vertical end portion attached thereto, said support member elevating said base frame member second end a like selected distance above the support surface, at least a portion of said support member extending exterior said first and second planar U-shaped tubular frame sections;

(d) a pair of rigid tubular handle members each with first and second ends, a first handle member coplanar and pivotally attached at said handle member first end to said planar first U-shaped frame section contained in said second generally vertical end portion adjacent said support member, a second handle member coplanar and pivotally attached at said handle member first end to said planar second U-shaped frame section contained in said second generally vertical end portion adjacent said support member;

(e) a linear U-shaped bracket member with an open bottom and ends, said bracket member attached to one planar U-shaped frame section contained in said second generally vertical end portion, adjacent said support member, said bracket member sized to accept said handle member first end, with a first pin member passing through said bracket member and handle member first end, thereby allowing rotation of said handle member about said pin member from a vertical orientation to a horizontal orientation with said bracket member preventing movement of said second end of the handle member higher than said handle member first end rotatably fastened in said bracket member; and (f) a second pin member for insertion through a pair of apertures in said bracket member, said handle member first end having apertures alignable with said bracket member apertures by rotation of said handle member to a horizontal orientation.

* * * * *